US012096334B1

(12) United States Patent
McShane et al.

(10) Patent No.: US 12,096,334 B1
(45) Date of Patent: Sep. 17, 2024

(54) TECHNIQUES FOR CONNECTING A DISCONNECTED WIRELESS DEVICE TO A CLOUD-BASED COMMUNICATIONS SERVER VIA A PROXY DEVICE

(71) Applicant: Relay, Inc., Raleigh, NC (US)

(72) Inventors: Ryan McShane, Raleigh, NC (US); Sai Rathnam, Raleigh, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 18/631,178

(22) Filed: Apr. 10, 2024

Related U.S. Application Data

(63) Continuation of application No. 18/614,931, filed on Mar. 25, 2024.

(51) Int. Cl.
*H04W 40/22* (2009.01)
*H04L 67/56* (2022.01)
*H04W 4/18* (2009.01)
*H04W 88/06* (2009.01)

(52) U.S. Cl.
CPC ............. *H04W 40/22* (2013.01); *H04L 67/56* (2022.05); *H04W 4/18* (2013.01); *H04W 88/06* (2013.01)

(58) Field of Classification Search
CPC ....... H04W 40/22; H04W 4/18; H04W 88/06; H04L 67/56
See application file for complete search history.

(56) References Cited

U.S. PATENT DOCUMENTS

| | | | |
|---|---|---|---|
| 9,350,763 B1* | 5/2016 | McHugh | H04L 65/00 |
| 11,425,113 B2* | 8/2022 | Allen | H04L 67/02 |
| 2015/0127722 A1* | 5/2015 | Feng | H04L 67/565 |
| | | | 709/203 |
| 2016/0205185 A1* | 7/2016 | Gampel | H04L 61/5007 |
| | | | 709/218 |
| 2022/0103525 A1* | 3/2022 | Shribman | G06F 16/9574 |
| 2023/0367833 A1* | 11/2023 | Kol | H04L 67/56 |

* cited by examiner

*Primary Examiner* — Will W Lin
(74) *Attorney, Agent, or Firm* — Gregory Stephens

(57) ABSTRACT

In a system comprising a plurality of wireless multi-modal portable communication devices (MMPCDs) communicable with one another via a cloud-based communication platform server (CPS), techniques are disclosed for configuring a proxy scheme to permit a disconnected multi-modal portable communication device (MMPCD) to connect to a cloud-based communication platform server (CPS) via a proxy device having a connection to the CPS. Once connected, additional techniques for sending and receiving messages via the proxy scheme are disclosed.

18 Claims, 7 Drawing Sheets

400

500

700

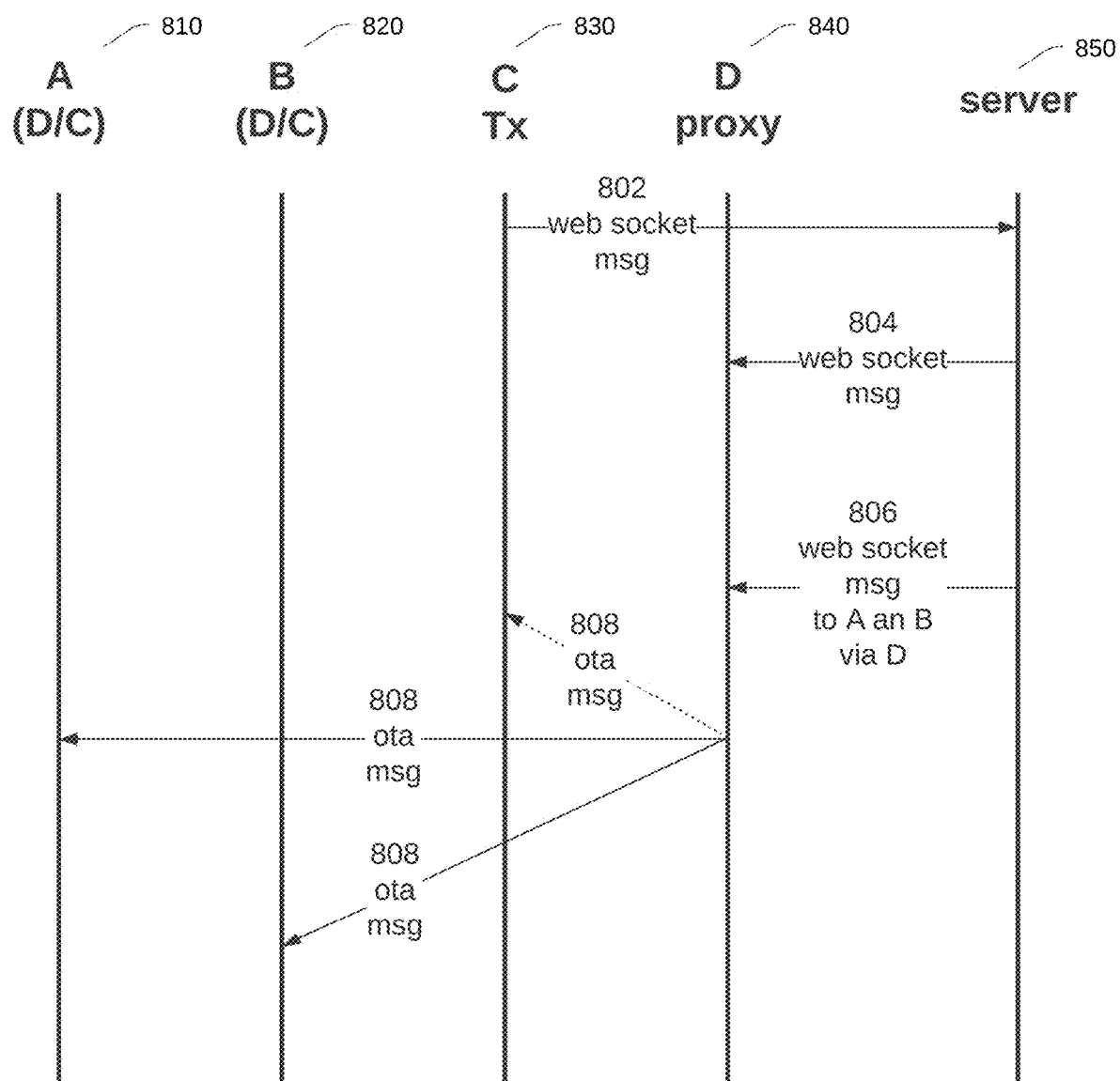

TECHNIQUES FOR CONNECTING A DISCONNECTED WIRELESS DEVICE TO A CLOUD-BASED COMMUNICATIONS SERVER VIA A PROXY DEVICE

CROSS-REFERENCE TO RELATED APPLICATIONS

This application is a continuation of and claims the benefit of U.S. Ser. No. 18/614,931 filed on Mar. 25, 2024.

TECHNICAL FIELD

Examples described herein are generally related to techniques for establishing a proxy scheme in a communications system to allow enable a device disconnected from a cloud-based communications platform server to exchange messages with the server using a proxy device.

BACKGROUND

Sometimes in communications systems in which a plurality of multi-modal communication devices communicate with one another via a centralized cloud-based communications server responsible for managing such communications, one or more devices may lose direct connectivity to an access point in communication with the cloud-based communications server. When this occurs, it becomes necessary to proxy communications from a disconnected device through a connected device. This becomes more complicated when the RF protocol utilized by the disconnected device is not either WiFi or cellular.

What is needed is a technique for a proxying the communications of a disconnected device through a connected device to a cloud-based communications server such that voice and data messages may be exchanged between and among the disconnected device, the cloud-based communications server, and other communication devices in the network.

SUMMARY

In a system comprising a plurality of wireless multi-modal portable communication devices (MMPCDs) communicable with one another via a cloud-based communication platform server (CPS), techniques are disclosed for configuring a proxy scheme to permit a disconnected multi-modal portable communication device (MMPCD) to connect to a cloud-based communication platform server (CPS) via a proxy device having a connection to the CPS. Embodiments may describe the processes and techniques used to create a proxy scheme, use the proxy scheme to send messages from a disconnected MMPCD, and receive messages into a disconnected MMPCD.

The disconnected MMPCD may broadcast a disconnect (DC) message over one of a plurality of its transceivers which may include, for instance, a LoRa transeciver. The DC message may be intended for any other radio transceiver having a WiFi or cellular connection to the CPS. The disconnected MMPCD may receive an acknowledgment (DC ACK) message from at least one potential proxy device. The disconnected MMPCD may then select one of the potential proxy devices that returned a DC ACK message to become the proxy device and send a forwarding request (F/W REQ) message to that selected proxy device. The disconnected MMPCD may then receive a forwarding response (F/W RESP) message from the proxy device confirming it will act as the proxy device.

The proxy device may then send a register forwarder event (REG F/W EV) message to the CPS informing it that the proxy device will be proxying messages on behalf of the disconnected MMPCD. The proxy scheme may be intended to operate such that subsequent messages received from the proxy device over an RF interface that originated from the disconnected MMPCD may be recognized as having been originated by the disconnected MMPCD. Additionally, subsequent messages intended for the disconnected MMPCD may be sent by the CPS to the proxy device to be forwarded by the proxy device to the disconnected MMPCD.

In one embodiment, the proxy device is another MMPCD. In another embodiment, the proxy device may be a special purpose long range (LoRa) forwarding device.

In one embodiment, the broadcasting of the DC message by the MMPCD occurs periodically until the DC message may be either acknowledged by at least one potential proxy device or the MMPCD may be able to re-connect with the CPS itself using one of its transceivers.

In one embodiment, the potential proxy devices may be configured to monitor an internal LoRa transceiver for the presence of any DC messages.

In one embodiment, the selecting one of the potential proxy devices that returned a DC ACK message to the disconnected MMPCD to become the proxy device may be based on multiple factors. For instance, the disconnected MMPCD may determine a proximity factor based on which potential proxy device responded first, a load balancing factor based on determining how many other devices a potential proxy device may be already acting as a proxy, and a capacity factor based on if the potential proxy device may be a special purpose LoRa access point.

In one embodiment, the F/W RESP message includes the physical channel to which the disconnected MMPCD may tune its LoRa transceiver to enable communication with the proxy device.

In one embodiment, the proxy device may receive an over-the-air message from a disconnected MMPCD for which it has established a proxy scheme. The proxy device may then wrap the payload of the received over-the-air message into a web socket message and forward it to the CPS for processing. The forwarded web socket message may further include an indication that it is a forwarded message from the MMPCD it is proxying for.

In one embodiment, the proxy device may receive a web socket message from the CPS of a type indicative of a forwarding event. The forwarding event message type may include a wrapper around the underlying message that identifies one or more MMPCDs for which the proxy device is proxying as the intended recipients in the 'to' field. The proxy device, may then re-package the underlying message into an over-the-air message to be broadcast. Any devices (e.g., MMPCDs) receiving the broadcast will check the 'to' field to determine whether message is intended for them. If it is, the receiving device may then play the message. If it is not, the receiving device will ignore the message.

Any illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one

FIG. 8 is a messaging diagram for using a proxy scheme to receive messages according to embodiment(s) of this disclosure.

DETAILED DESCRIPTION

Certain aspects and features of the present disclosure involve techniques for configuring a proxy scheme to permit a disconnected multi-modal portable communication device (MMPCD) to connect to a cloud-based communication platform server (CPS) via a proxy device having a connection to the CPS.

Figure 1:
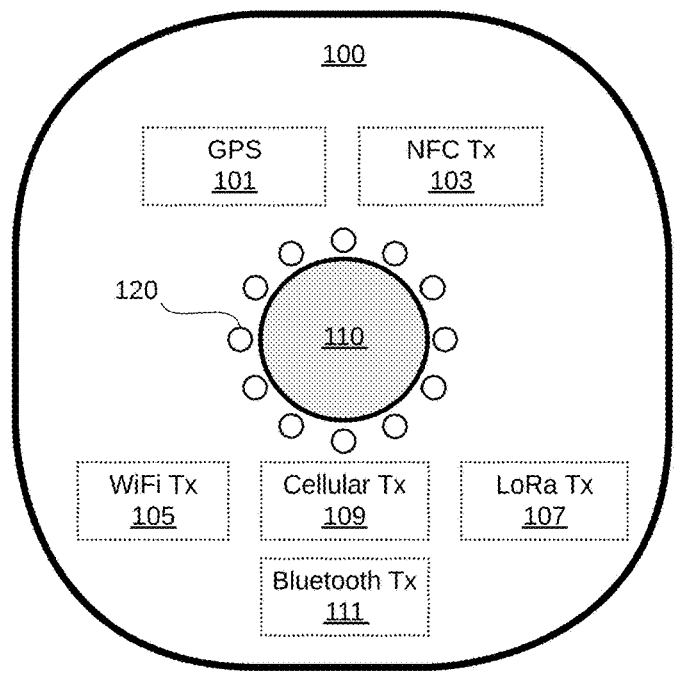
FIG. 1 illustrates a multi-modal portable communications device according to embodiment(s) of this disclosure.

FIG. 1 illustrates a multi-modal portable communication device (MMPCD) 100 for use with the embodiments of the invention described herein. The term multi-modal refers to the ability of the portable communication device to operate using a plurality of radio transceivers. For instance, MMPCD 100 may include a cellular transceiver 109, a WiFi transceiver 105, a LoRa transceiver 107, and a Bluetooth transceiver 111. The cellular transceiver 109 may comprise an RF chipset configured to communicate using a plurality of wireless cellular frequency bands and protocols. The WiFi transceiver 105 may comprise an RF chipset configured to communicate using one or more of the 802.11 protocols commonly referred to as WiFi. The Bluetooth transceiver 111 may comprise an RF chipset configured to communicate using the Bluetooth short range wireless protocol(s). The LoRa (Long Range) transceiver 107 may comprise an RF chipset configured to communicate using yet another RF communication protocol known as LoRa. LoRa is a physical radio communication protocol based on spread spectrum modulation techniques that uses sub-GHz radio transceivers ideal for long range wireless applications and long battery life.

The MMPCD 100 may further comprise a GPS (Global Positioning System) module 101 and an NFC (Near Field Communication) module 103. All of the aforesaid internal components may be under the control of one or more microprocessors (not shown) that together comprise MMPCD 100 that is configurable to communicate with a cloud-based server and other MMPCDs. With respect to a user interface, a control button 110 and a plurality of indicator lights 120 are shown. Other control buttons may be present but not shown on the MMPCD 100.

Figure 2:
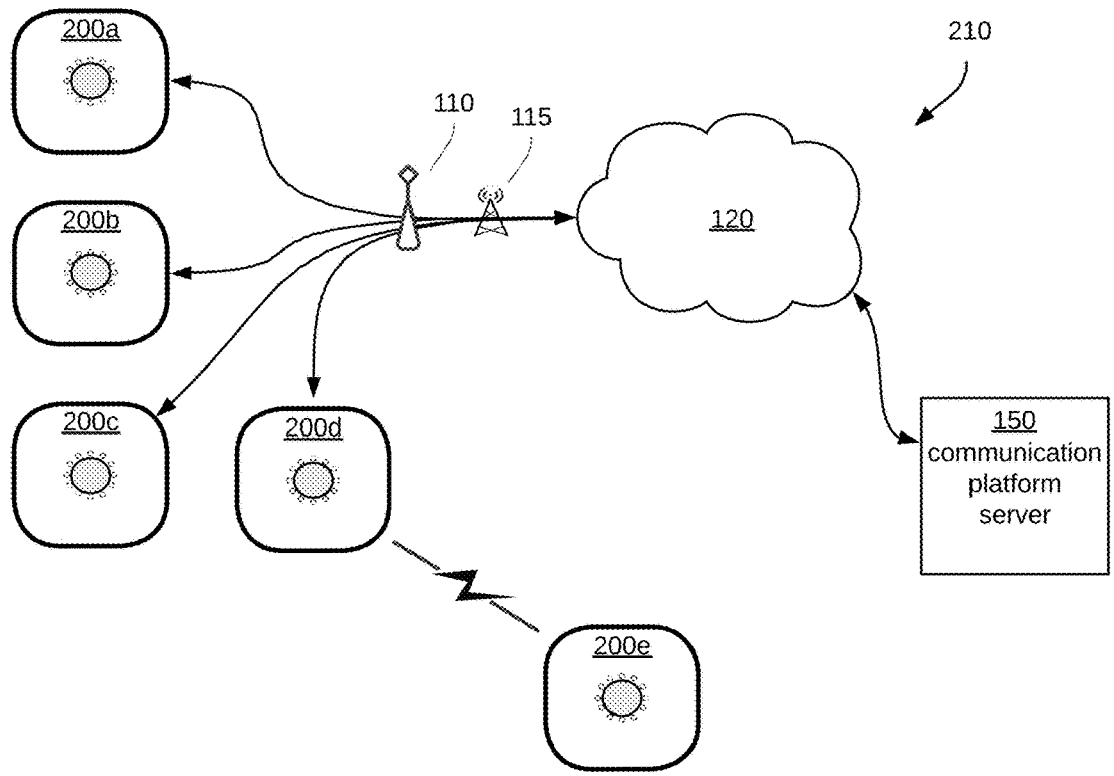
FIG. 2 illustrates a plurality of multi-modal portable communications devices in a larger communications system according to embodiment(s) of this disclosure.

FIG. 2 illustrates a network environment that may be characterized as a communication platform (CP) 210 enabling a plurality of MMPCDs to communicate with one another through message exchanges brokered by a server. In addition, a disconnected MMPCD 200e may be configured to communicate with other MMPCDs or the server despite not having a direct connection with the server according to an embodiment of the invention. In this example, five (5) MMPCDs 200a-e comprise a group that have been configured to communicate with one another under the management of a cloud-based communication platform server (CPS) 150. MMPCDs 200a-d are 'connected' to an access point such as a WiFi access point 110 or cellular basestation 115 which is coupled via the Internet 120 to CPS 150. In this exemplary illustration, MMPCD 200e is shown as 'disconnected' from CPS 150 in that it does not have a connection to access point 110 or cellular basestation 115 and therefore does not have a connection to CPS 150. MMPCD 200e may be connected, however, to MMPCD 200d via, for instance, a LoRa transceiver 107 within each multi-modal portable communication device. MMPCD 200d may then act as a proxy for MMPCD 200e in communications with CPS 150 utilizing the novel methods and processes described below.

Figure 3:
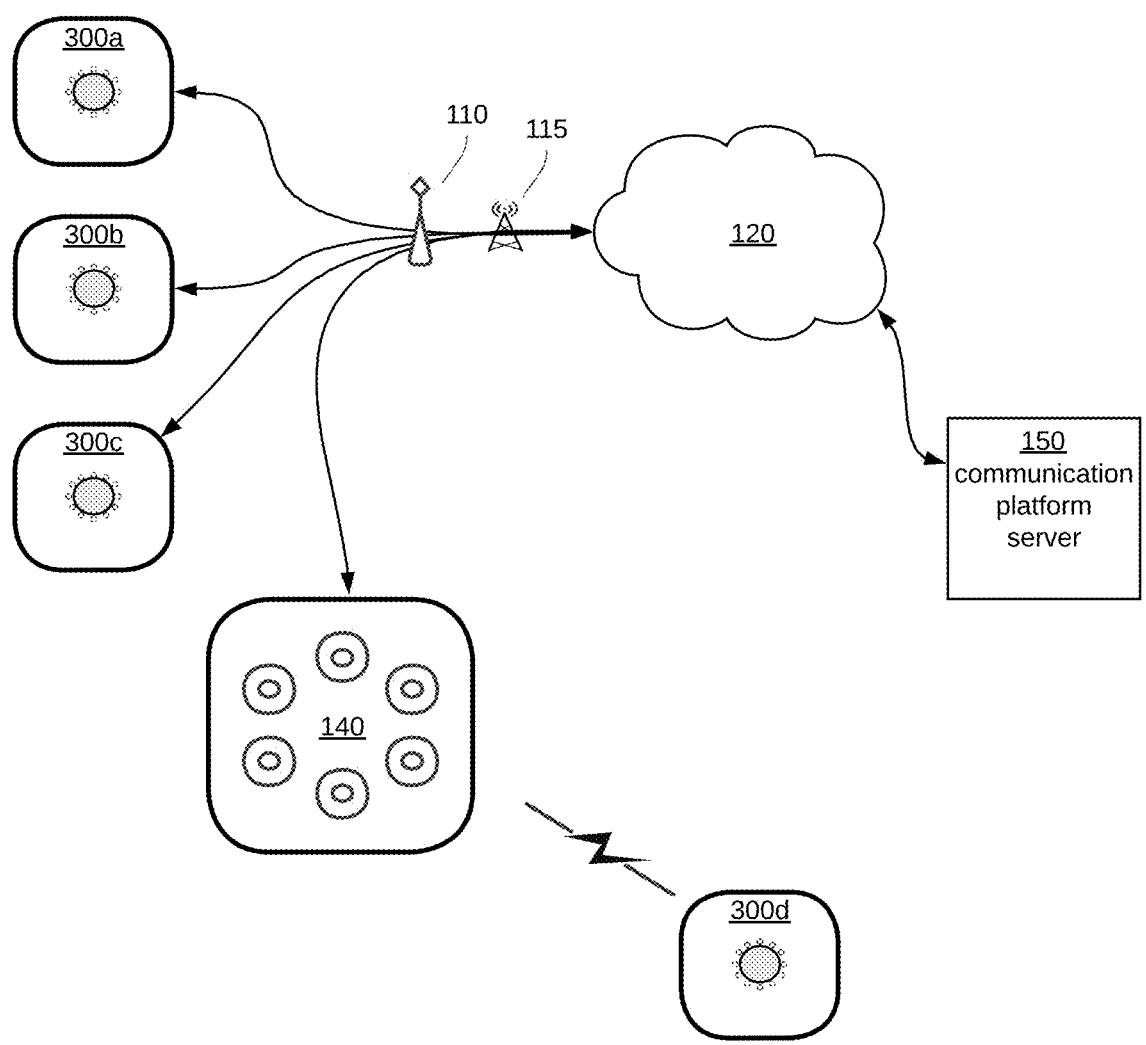
FIG. 3 illustrates a multi-modal portable communications device and multi-modal signal extender device in a larger communications system according to embodiment(s) of this disclosure.

FIG. 3 illustrates another network environment for communicating with a disconnected MMPCD 100 according to an embodiment of the invention. In this example, four (4) MMPCDs 300a-d comprise group that have been configured to communicate with one another just as in FIG. 2 above. MMPCDs 300a-c are 'connected' to an access point such as a WiFi access point 110 or cellular basestation 115 which is coupled via the Internet 120 to cloud-based CPS 150. In this case, MMPCD 300d is 'disconnected' from CPS 150 in that it does not currently have connection to access point 110 or cellular basestation 115. MMPCD 300d is connected, however, to a special purpose LoRa access point 140 acting as a proxy to provide connectivity for the disconnected MMPCD 300d to the CPS 150. Special purpose LoRa access point 140 may be comprised of multiple LoRa transceivers. The deployment of one or more special purpose LoRa access points 140 may be intended to extend the range of an MMPCD 100 when cellular or WiFi connectivity is insufficient in some locations.

MMPCDs 100 may communicate with the cloud-based CPS 150 via a cellular network basestation 115 that is coupled to the Internet 120. Alternatively, MMPCDs 100 may communicate with the cloud-based CPS via a WiFi access point 110 that is coupled to the Internet 120. In normal operation, an MMPCD 100 will first seek to establish a connection to the CPS 150 over a WiFi access point 110 as it generally provides a stable and low cost means of connecting the MMPCD 100 with the CPS 150. When there is either no WiFi connection available or a significantly degraded WiFi connection, the MMPCD 100 may default to using a cellular connection via a basestation 115 to connect to CPS 150. Such a connection is generally suitable from a quality of service (QoS) standpoint but using a cellular network incurs additional cost for the privilege of using the basestation 115. Thus, it is typically treated as a second choice to WiFi.

In some scenarios, an MMPCD 100 may become disconnected from or out of range of a cellular network and a WiFi network. When this occurs, the MMPCD 100 may default to using the LoRa transceiver 107 and the techniques described herein to communicate with another MMPCD 100 that has a connection to the CPS 150. Alternatively, the MMPCD 100 may default to using the LoRa transceiver 107 to communicate with a special purpose LoRa access point 140 as described above.

In the first example of FIG. 2, a disconnected MMPCD 200e may use its LoRa transceiver 107 to communicate with connected MMPCD 200d acting as a proxy to provide connectivity to CPS 150 for the disconnected MMPCD 200e. In the second example, a disconnected MMPCD 300d may use its LoRa transceiver 107 to communicate with a connected special purpose LoRa access point 140 acting as a proxy to provide connectivity to CPS 150 for the disconnected MMPCD 300d.

In general, a plurality of MMPCDs are designed and configured to communicate with one another via the CPS 150 or with the CPS 150 using the communications platform (CP) 210. Communication is in the form of messages communicated over logical channels that are managed by the CPS. Messages are passed from MMPCDs to the CPS or vice versa. Messages from one MMPCD to one or more other MMPCDs pass through the CPS for routing to the intended MMPCD(s).

A logical channel is distinct from a physical channel. In this disclosure, a physical channel refers to the frequency band within which RF signals may be sent and received over the various RF transceivers described herein. In contrast, a logical channel refers to a software construct in which communications among one or more MMPCDs and the CPS may be organized. For instance, for a hotel customer deploying a plurality of MMPCDs, there may be a housekeeping channel wherein all MMPCDs associated with the housekeeping function may communicate. Similarly, there may be a security channel wherein all MMPCDs associated with the security function may communicate. Any given MMPCD may be able to communicate over multiple logical channels. However, an MMPCD may only be set to one logical channel at any given time. The MMPCDs are able to switch among channels as needed.

Logical channels may be functional in nature or may be communicative in nature or both. An example of a functional logical channel may be, for instance, a Spanish translate channel in which a user may speak an English message into the MMPCD while it is set on the Spanish translation channel. The message is forwarded to the CPS where it is translated to a Spanish message. The Spanish message is then returned from the CPS to the device where it may be played back.

Communicative logical channels are generally configured to allow message exchanges among multiple MMPCDs. For instance, a logical channel linking MMPCD 200a and MMPCD 200c may be created (and given a label or name) in which all messages exchanged through the CPS 150 on that channel only play on those MMPCDS. The logical channel membership in this example is comprised of unique identifiers for MMPCD 200a and MMPCD 200c. Logical channels may be created and deleted by end users or administrators as appropriate. Logical channel membership may change as MMPCDs join and leave the channel. The logical channel construct may also be able to receive messages from multiple groups but can only send to one group at any given moment. This may be referred to as logical channel scanning.

The CPS 150, via a computer-based dashboard, for instance, may establish and manage groups and sub-groups of MMPCDs using the logical channel construct. Certain communications (e.g., voice messages) may originate from one MMPCD and be intended for specific other MMPCDs. The CPS 150 must be able to keep track of logical channels (and channel membership) to disseminate messages to the proper group(s) of MMPCDs.

When the CPS 150 loses connectivity with an MMPCD, it can determine if a proxy for the disconnected MMPCD has been established. A proxy may comprise another MMPCD (or special purpose LoRa access point 140) that is connected to the CPS 150 and is also communicable with the disconnected MMPCD using an over-the-air RF transceiver (e.g., LoRa transceiver 107). If a proxy has been established as described below, messages may be sent to and from the disconnected MMPCD via the proxy device. Proxying typically involves wrapping a special envelope around the original message so that the message may be handled by the proxy device on behalf of the disconnected MMPCD.

Messages exchanged between an MMPCD and the CPS via a cellular 115 or WiFi 110 access point are of one construct while messages exchanged over the air directly via LoRa 107 with another MMPCD (or special purpose LoRa access point 140) are of another construct. Messages sent directly between MMPCDs (e.g., over LoRa) are comprised of a header portion and a payload portion with the header portion including a message type (msg_type) field, a sending device identifier, and a receiving device identifier. The payload portion is the underlying message intended for CPS 150. Whereas, messages exchanged between MMPCDs and the CPS 150 typically utilize a data format such as, for instance, MessagePack or JSON (JavaScript Object Notation).

In general, when a proxy device is utilized for message forwarding, the proxy device receives messages from the disconnected MMPCD using the message construct for direct over the air communication. The proxy device may then wrap the payload portion in an envelope along with the identity of the original sending device and forward it to the CPS. Similarly, when the proxy device receives a message from the CPS intended for the disconnected MMPCD, it will re-package the message for transmission over the air directly to the disconnected MMPCD.

Figure 4:
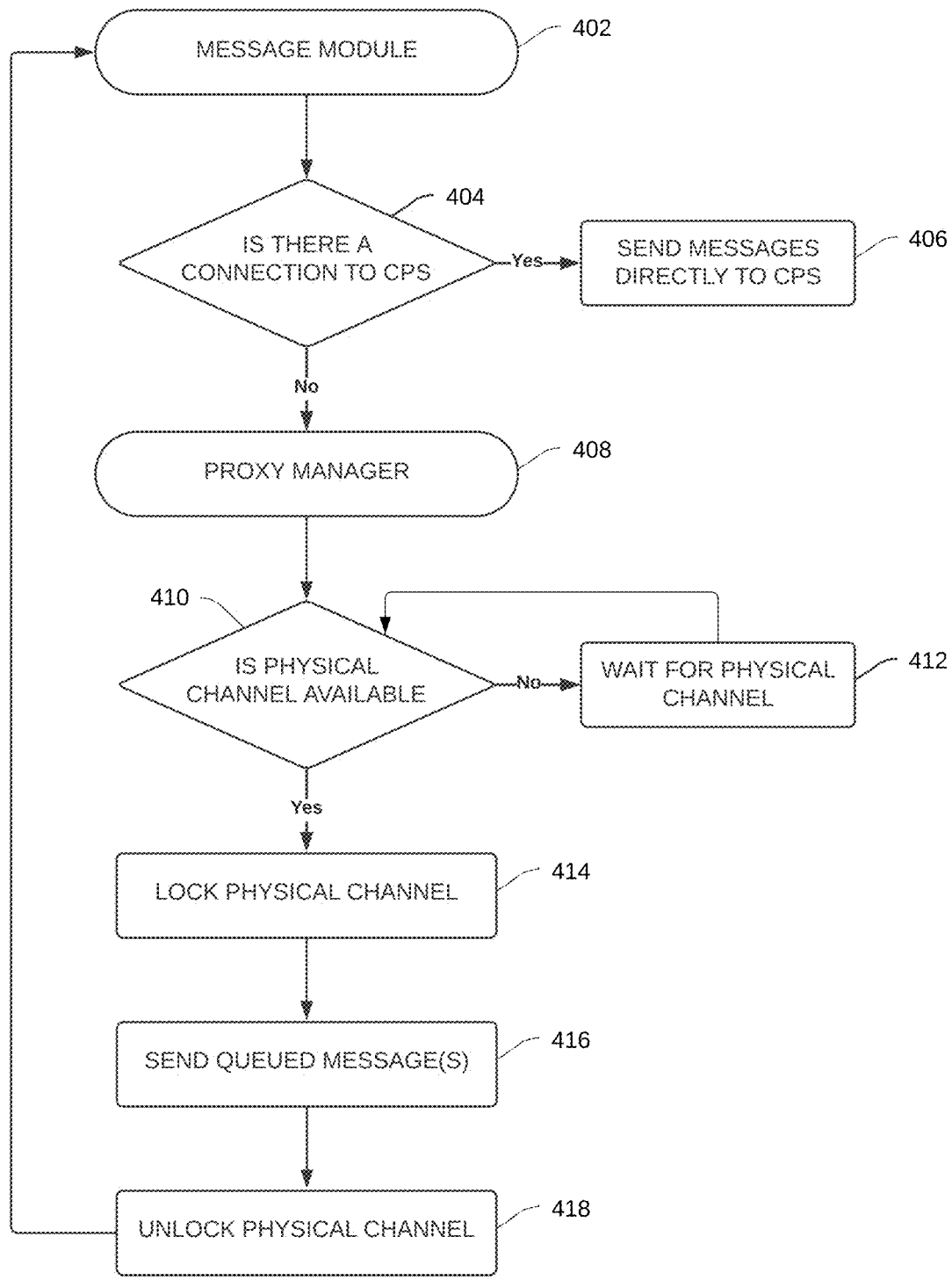
FIG. 4 is a is a logic diagram for sending messages over-the-air (ota) according to embodiment(s) of this disclosure.

FIG. 4 is a logic diagram 400 for sending messages over-the-air (ota) according to embodiment(s) of this disclosure. A messaging module process 402 that runs within each MMPCD and is configured to handle message traffic to and from the MMPCD. Message module process 402 determines in decision block 404 whether the MMPCD currently has a web socket connection with the CPS. If the result is yes, the MMPCD will exchange messages with the CPS normally over the web socket connection in block 406. If the result is no, a proxy manager 408 within the MMPCD may be utilized to send over-the-air (ota) messages using, for instance, a LoRa transceiver to a proxy device that has a web socket connection to the CPS.

Without a direct web socket connection to the CPS, the MMPCD is considered disconnected. A proxy manager 408 within a disconnected MMPCD may then utilize an RF transceiver such as LoRa transceiver 107 to communicate directly with other MMPCDs that also have LoRa transceivers 107. The goal is to set up and then use a proxy scheme that will permit the disconnected MMPCD to communicate directly with a connected MMPCD such that the connected MMPCD will act as a forwarder or proxy of messages between the disconnected MMPCD and the CPS.

Use of the LoRa transceiver 107 among a plurality of MMPCDs within range of one another involves a negotiation of a physical channel on which an MMPCD can transmit messages (data). Only one MMPCD may have transmit control over a physical channel at any given time. Proxy manager 408 may determine, in decision block 410, whether a physical channel is currently available for use. This may be determined by having LoRa transceiver 107 send out a series of short channel activity detection (CAD) tests to see if the physical channel is clear of radio broadcasts. If no physical channel is currently available, the disconnected MMPCD will wait until a physical channel becomes available in block 412. This may involve ensuring that a CAD check results in no activity detected. If a CAD check does detect activity, the determination 410/wait 412 loop may continue until there is no CAD activity meaning a physical channel is available. When a physical channel does is available, proxy manager 408 may lock the physical channel in block 414 by sending out a channel lock message to indicate a desire to hold the physical channel. Once the physical channel is secured, the disconnected MMPCD may broadcast any queued messages in block 416. The format of these messages is discussed in greater detail below. Once the queued messages have been broadcast, the disconnected MMPCD may then unlock and release the physical channel by sending out an unlock physical channel message in block 418. The unlock physical channel message informs other MMPCDs that the MMPCD that held the physical channel is finished and another MMPCD is free to secure the physical channel if needed. In practice, MMPCDs receiving an unlock channel message may execute a timeout before seeking to lock the physical channel to broadcast their own messages. The timeout may be designed to further avoid packet collisions while transitioning from one sender to another.

The process just described for securing, sending messages, and releasing a physical channel utilizing the LoRa transceiver 107 is the same for all MMPCDs, whether connected or disconnected to the CPS.

Figure 5:
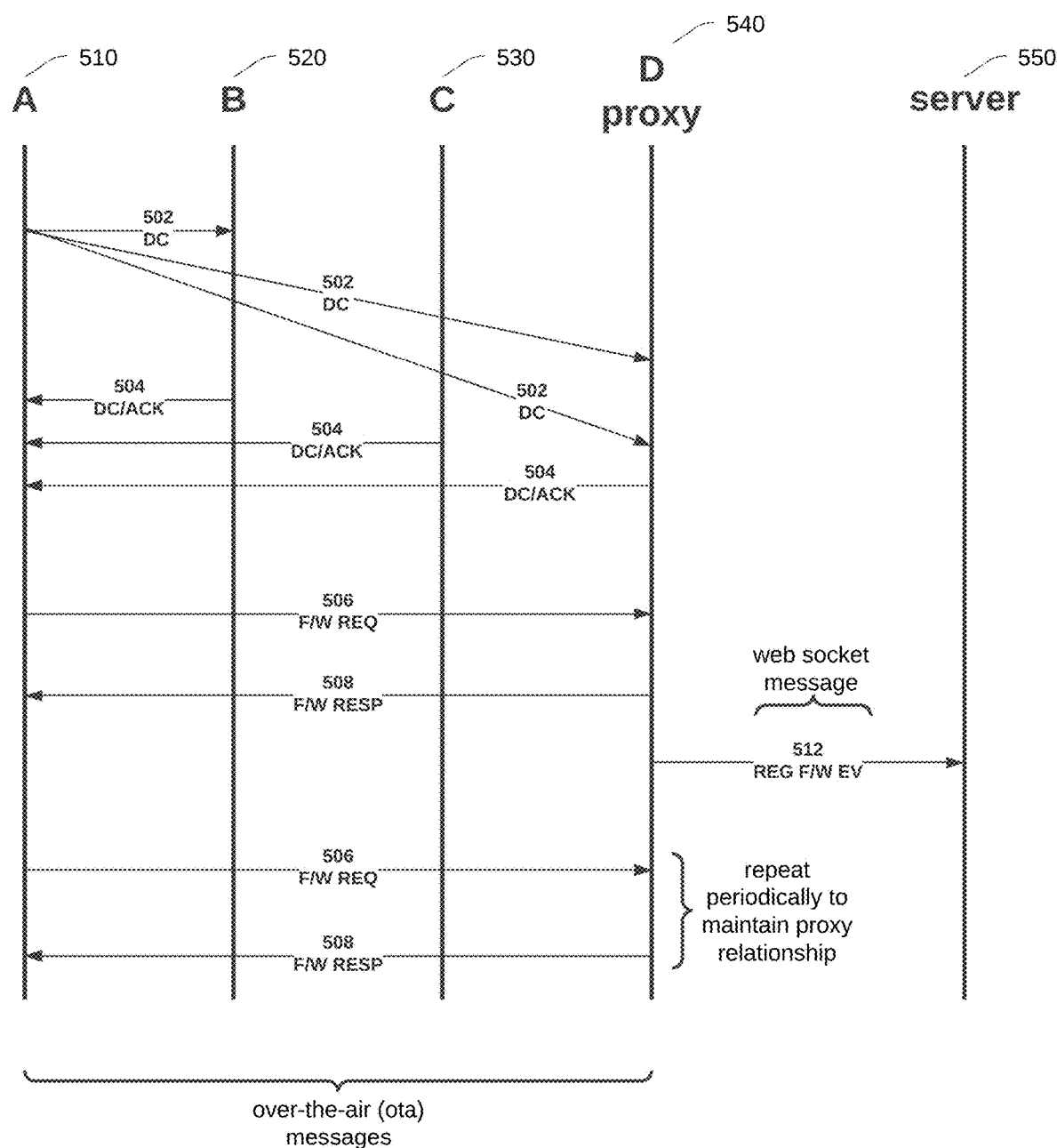
FIG. 5 is a messaging diagram for creating a proxy scheme according to embodiment(s) of this disclosure.

FIG. 5 is a messaging diagram 500 for creating a proxy scheme to allow a disconnected MMPCD communicate with a CPS according to embodiment(s) of this disclosure. In this embodiment, when MMPCD-A 510 realizes it no longer has a connection to CPS 550, it broadcasts a disconnect (DC) message 502 over one of its RF transceivers (e.g., LoRa transceiver 107) in hopes of finding another MMPCD (or special purpose LoRa access point 140) that can act as a proxy for exchanging messages with the CPS 550. MMPCD-A 510 will utilize the process described in FIG. 4 to access and use a physical channel over its LoRa transceiver 107.

The disconnect (DC) message 502 may be sent by the disconnected MMPCD-A 410 periodically (e.g., every 30 seconds) until the message is acknowledged by one or more nearby MMPCDs or until MMPCD-A 510 is able to re-establish a connection with CPS 550. MMPCDs may be configured to monitor their LoRa transceivers for DC messages 502 in the background.

In particular, the DC message 502 may include a header portion and a payload portion, wherein the header portion is comprised of a message type (i.e. disconnect message), a sending device identifier (i.e., identifier of the disconnected MMPCD), and a receiving device identifier (null for this message type as the message is a broadcast message rather than directed at a particular device or logical channel) and the payload portion is comprised of encrypted data indicative of an account associated with the disconnected MMPCD.

In this example, DC message 502 may be received by MMPCD-B 520, MMPCD-C 530, and MMPCD-D 540. Any MMPCD receiving a DC message 502 must be able to decrypt the payload portion to verify that the disconnected MMPCD and the potential proxy device are associated with the same account because only devices associated with the same account may proxy for one another. In this example, MMPCD-B 520, MMPCD-C 530, and MMPCD-D 540 may have received and verified the payload of the DC msg 502 causing them to return an acknowledgment message (DC ACK) 504 back to MMPCD-A 510. For instance, each of MMPCD-B 520, MMPCD-C 530, and MMPCD-D 540 may return a DC ACK 504 in which the header portion includes a message type of DC ACK, a sending identifier that identifies itself (i.e., MMPCD-B 520, MMPCD-D 530, or MMPCD-D 540), and a receiving identifier that identifies the disconnected MMPCD-A 510. The payload portion may comprise data indicative of (i) what type of device the potential proxy device is, and (ii) how many other MMPCDs the potential proxy device is currently proxying for.

MMPCD-A 510 may then select one of the responding MMPCDs to act as a proxy with CPS 550 based on certain criteria. For instance, the first device to respond may be the closest. The acknowledgment messages (DC ACK) 504 may further include an indication of how many other devices the responding device(s) are proxying for already. In general, the more devices a potential proxy device is already proxying for, the less likely it will be chosen to proxy for another device. If the responding device happens to be a special purpose LoRa access point 140, it may be given a higher priority based on its inherent capacity to proxy more than a standard MMPCD. Thus, the selection process within MMPCD-A 510 factors range, load balancing, and type of responding device when determining which responding device should serve as the proxy.

In this example, MMPCD-A 510 has chosen MMPCD-D 540 to send a F/W REQ message 506. The header portion of F/W REQ message 506 may include a F/W REQ message type, the disconnected MMPCD's sending device identifier, and the potential proxy device's receiving device identifier. The payload portion may include encrypted data indicative of an account associated with the disconnected MMPCD.

MMPCD-D 540 may respond with a forwarding response message (F/W RESP) 508 to indicate it will act as a proxy between MMPCD-A 510 and CPS 550. The header portion of the F/W RESP message 508 may include a message type of F/W RESP, the proxying device's identifier as the sending device identifier, and the disconnected MMPCD's identifier as the receiving device identifier. The payload portion of the F/W RESP 508 may include information such as which physical channel (i.e., frequency band) to tune the transceiver of MMPCD-A 510. In one embodiment, the transceiver of choice is the LoRa transceiver 107.

MMPCD-D 540 may then send a register forwarding event message (REG F/W EV) 512 to CPS 550. REG F/W EV message 512 may include the device identifier for MMPCD-A 510 to let CPS 550 know that MMPCD-A 510 is using MMPCD-D 540 as its proxy until it can reestablish a direct connection to CPS 550.

In one embodiment, once MMPCD-A 510 has established its proxy connection with MMPCD-D 540, the disconnected device (e.g., MMPCD-A 510) MMPCD-A will periodically (e.g., every 5 minutes) resend the F/W REQ message 506 to the proxy device (e.g., MMPCD-D 540). The proxy device must reply back with the F/W RESP message 508 within a predetermined period (e.g., 30 seconds) to ensure the proxy relationship still exists and will be maintained.

If the disconnected MMPCD does not send the subsequent F/W REQ message 506, the proxy device may then notify CPS 550 that it is no longer proxying for the disconnected MMPCD by sending an unregister_forwarder_event message. Similarly, if the disconnected MMPCD does not receive a F/W RESP message 508 from the proxy device within the requisite timeout period it will assume the proxy device is no longer in range and re-initiate the process by sending out another DC message 502.

If the disconnected MMPCD reconnects to CPS 550 or chooses a different proxy device, it will send a connected_elsewhere message to its previous proxy device. A proxy device that receives a connected_elsewhere message will notify CPS 550 that it no longer needs to forward messages on behalf of the disconnected MMPCD with an unregister_forwarder_event message.

Once MMPCD-D 540 and CPS 550 have set up the proxy service on behalf of MMPCD-A 510, outbound and inbound message exchanges on all logical channels for which MMPCD-A 510 is a member may proceed according to the processes described in FIGS. 5-6 below.

The proxy device described above was MMPCD-D 540. It should be noted, however, that the proxy device (D) 540 could be a special purpose LoRa access point 140 that performs the proxy functions as described above.

CPS 550 maintains a record of MMPCDs that are proxy devices and which offline or disconnected MMPCDs they are proxying for. When CPS 550 receives a message intended for an MMPCD and does not find an active web socket session (i.e., connection) it will check the record of proxy devices. If a proxy device (e.g., MMPCD-D 540) is found for the target MMPCD it creates and sends a forwarded_es_event message to MMPCD-D 540. The forwarded_es_event message may be characterized as an envelope with the underlying message inside along with two fields, 'to' and 'from'. A proxy device like MMPCD-D 540 receiving a forwarded_es_event message from CPS 550 will send the envelope to the devices listed in the 'to' field over its LoRa radio 107. Likewise, a proxy device like MMPCD-D 540 receiving event messages over its LoRa radio will construct a forwarded_es_event message which includes the envelope and underlying message and deliver it to CPS 550, filling in the 'from' field with the address of the disconnected MMPCD-A 510. This tells CPS 550 who is the actual sender of the message. Similarly, when CPS 550 receives a forwarded_es_event message, it realizes the message is from a proxy device like MMPCD-D 540 and will route the event to the appropriate target session. MMPCDs like MMPCD-A 510 with a registered proxy device like MMPCD-D 540 are then marked as 'connected'. Proxying only affects MMPCDs that do not have active web socket connections with CPS 550.

Figure 6:
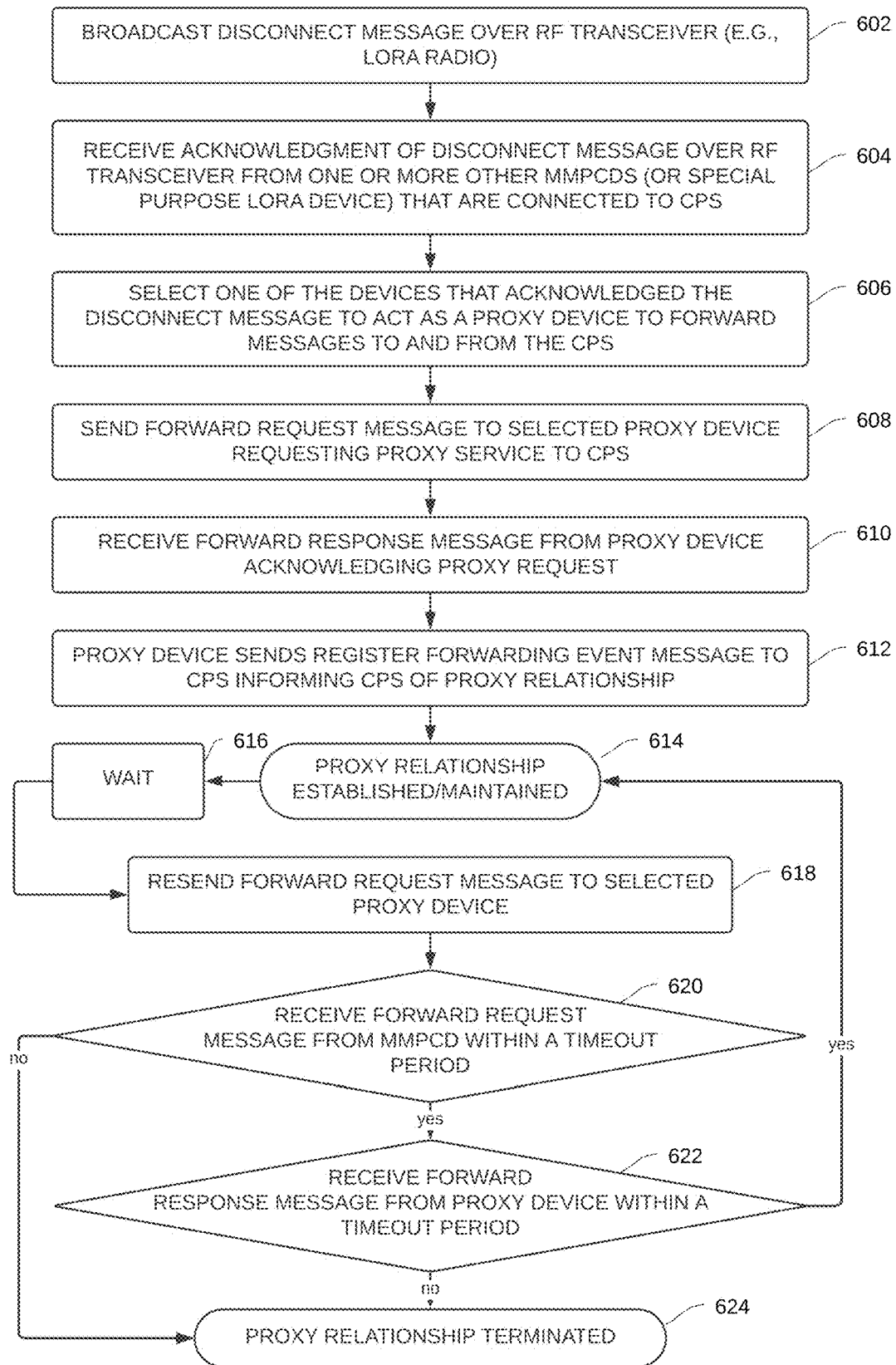
FIG. 6 is a logic diagram for creating a proxy scheme according to embodiment(s) of this disclosure.

FIG. 6 is a logic diagram 600 for creating a proxy scheme according to embodiment(s) of this disclosure. Logic diagram 600 tracks the message flow diagram of FIG. 5. Once an MMPCD realizes it does not have a direct web socket connection with the CPS, it may initiate a proxy setup scheme so it may exchange messages with the CPS indirectly via a proxy device. Messages broadcast pursuant to this logic diagram will be formatted as described in FIG. 5 above. In general, messages are broadcast such that all devices within range may receive the message. However, the message header will identify the intended specific recipient(s) of the message. Any device receiving a message for which it is not an intended recipient will ignore the message.

The proxy setup scheme may be initiated in block 602 by having the now disconnected MMPCD broadcast a disconnect message out over an RF transceiver such as, for instance, a LoRa transceiver. The disconnect message may be received by other MMPCDs within broadcast range of the disconnected MMPCD. The disconnect message may also be received by a special purpose LoRa access point within broadcast range of the disconnected MMPCD. MMPCDs and special purpose LoRa access points are configured to monitor the physical channels to detect broadcasts from other nearby devices. Any MMPCDs or special purpose LoRa access point receiving the disconnect message may formulate and broadcast an acknowledgment of the disconnect message that may be received by the disconnected MMPCD in block 604. Only those devices that currently have a web socket connection with the CPS may return an acknowledgment message to the disconnected MMPCD.

The disconnected MMPCD may then select a potential proxy device from amongst the devices that returned an acknowledgment message in step 606. The selection process may consider multiple factors including the distance, load balancing, and type of acknowledging device (e.g., MMPCD or special purpose LoRa access point) when determining which acknowledging device may be best suited to serve as the proxy.

Once the disconnected MMPCD selects a potential proxy device, it will broadcast a forward request message identifying the selected device as the intended recipient of the message in block 608. The selected device may then receive the forward request message and construct and send a forward response message in reply. The disconnected MMPCD may then receive the forward response message acknowledging and agreeing to the proxy setup in block 610. The selected device may now be characterized as the proxy device for the disconnected MMPCD. To complete the proxy setup scheme, the proxy device may send a register forwarding event message over its web socket connection to the CPS in step 612. The register forwarding event message informs the CPS that the proxy device will be acting as a message forwarder for the disconnected MMPCD.

Now that the proxy relationship has been established 614 it must be maintained. Maintaining the proxy relationship involves the disconnected MMPCD waiting a predetermined time in block 616 before re-sending a forward request message to the proxy device in block 618. If the forward request message is not received by the proxy device within a predetermined timeout window (e.g., 5 minutes), the proxy relationship may be terminated in block 624. Termination may involve having the proxy device send a web socket message to the CPS informing the CPS that it is no longer proxying for the disconnected MMPCD. The proxy device then monitors for a forward response message in decision block 622. If the forward response message is not received within a predetermined timeout window from the sending of the forward request message (e.g., 30 seconds) then the MMPCD will assume the proxy relationship is no longer available. In this case, the disconnected MMPCD will attempt to establish another proxy relationship with suitable nearby devices.

A messaging module within each MMPCD may be responsible for managing message traffic on device. Under normal operating conditions, the MMPCD will be connected to the CPS directly via WiFi 110 or cellular 115 and messaging would occur directly with the CPS over a web socket mechanism such as JSON or MessagePack. When an MMPCD is disconnected, however, the messaging module adjusts to use a proxy manager in its handling of message traffic.

Under the proxy scheme, certain messages are constructed as forwarding events to indicate that the underlying message has been wrapped in an envelope labeled, for instance, forwarded_es_event. A connected MMPCD proxy device receiving a forwarded_es_event message from the CPS sends the envelope containing the underlying message to the MMPCDs listed in the 'to' field over its LoRa radio. Likewise, a connected MMPCD proxy device receiving messages over its LoRa radio will construct a forwarded_es_event message which contains the underlying message and deliver it to the CPS over its web socket connection, filling in the 'from' field with the device identifier of the original sender MMPCD.

The CPS maintains a record of MMPCDs that are acting as proxy devices and which disconnected MMPCDs they are proxying for. If the CPS receives a message for an MMPCD and does not find an active web socket session for that MMPCD it will check the record of proxy devices. If a proxy device is found for the target MMPCD, the CPS creates a forwarded_es_event message and sends that to the proxy device. Similarly when the CPS receives a forwarded_es_event message, it will route the underlying message to the appropriate target session. A target session may be characterized as the logical channel for which an originating message is intended. The CPS maintains a record of the logical channel that each MMPCD is currently set on. When the CPS receives a message (whether directly from an MMPCD or forwarded via a proxy device), it determines the actual sending device identifier of the underlying message. The CPS then looks up the logical channel associated with that sending device identifier so it knows what other MMPCDs to route the message to. Some messages may be intended solely for the CPS depending on the nature of the logical channel.

MMPCDs with a registered proxy device are marked as connected. Proxying only affects MMPCDs that do not have active web socket connections with CPS 750.

Figure 7:
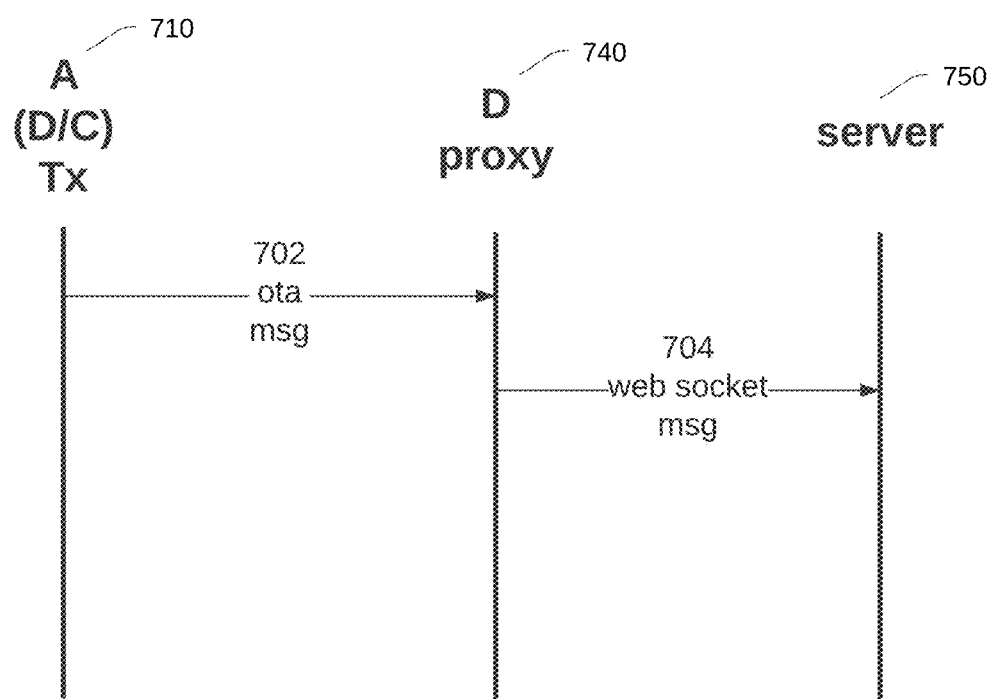
FIG. 7 is a messaging diagram for using a proxy scheme to transmit messages according to embodiment(s) of this disclosure.

FIG. 7 is a messaging diagram 700 for using a message forwarding proxy scheme like that described in FIGS. 5-6 to permit a disconnected MMPCD to send messages as if it were connected to the CPS according to embodiment(s) of this disclosure. Messaging diagram 700 describes the process(es) utilized to permit a disconnected MMPCD (e.g., MMPCD-A 710) to transmit messages to CPS 750 for dissemination to other MMPCDs on a logical channel.

In the example of FIG. 7, MMPCD-A 710 may be disconnected (DC) from CPS 750 and reliant on MMPCD-D 740 as a proxy device. Now, when MMPCD-A 710 wishes to transmit a voice message, for instance, on a particular logical channel to other members of that logical channel, the message (msg 702) is transmitted over, for instance, the LoRa transceiver 107 to MMPCD-D 740 using the message construct for direct over the air communications between devices. The header portion of msg 702 may include a msg_type of speech, the unique identifier of MMPCD-A 710 as the sending device identifier, and the unique identifier of MMPCD-D 740 as the receiving device identifier since MMPCD-D 740 is the proxy device that MMPCD-A 710 needs to get the message to CPS 750.

MMPCD-D 740, acting in its capacity as a proxy for MMPCD-A 710, strips the payload portion of msg 702 to retrieve the underlying message intended for CPS 750. MMPCD-D 740 as proxy may then forward a new message (msg 704) to CPS 750. For instance, the proxy device (MMPCD-D 740) receiving the speech message over its LoRa radio may construct a "forwarded_es_event" envelope around the original message and deliver it to CPS 750 over a web socket, filling in the 'from' field with the unique device identifier of the original sender (i.e., MMPCD-A 710).

CPS 750 receives msg 704 and determines it is a forwarded message and that MMPCD-A 710 is the original sender based on the 'from' field in msg 704. CPS 750 then determines the logical channel currently associated with MMPCD-A 710 and prepares to send the underlying message that was in the envelope to the other members of the logical channel.

The proxy device described above was MMPCD-D 740. It should be noted, however, that the proxy device MMPCD-D 740 could be a special purpose LoRa access point 140 that performs the proxy functions as described above.

FIG. 8 is a messaging diagram 800 for using a proxy scheme to allow a disconnected MMPCD to receive messages according to embodiment(s) of this disclosure. This messaging diagram 800 describes the process(es) utilized to permit disconnected MMPCDs (e.g., MMPCD-A 810, MMPCD-B 820) to receive messages from CPS 850 originating from another MMPCD (e.g., MMPCD-C 830) belonging to the same logical channel. In this example, MMPCD-C 830 transmits a message (msg 802) on a particular logical channel to CPS 850 over a web socket connection.

CPS 850 checks the logical channel associated with the sender of msg 802 and determines the other MMPCDs to which to send the message content. CPS 850 also determines which of the other MMPCDs on the logical channel are currently connected and which MMPCDs may be disconnected but utilizing a proxy device for receiving messages. In this example, the logical channel comprises four MMPCDs (MMPCD-A 810, MMPCD-B 820, MMPCD-C 830, and MMPCD-D 840). Of those four, two are connected directly with CPS 850 (MMPCD-C 830 and MMPCD-D 840) and two are disconnected (MMPCD-A 810 and MMPCD-B 820). The two that are disconnected (MMPCD-A 810 and MMPCD-B 820) have set up a proxy scheme like that described in FIGS. 5-6 in which MMPCD-D 840 is acting as a proxy device.

CPS 850 then sends the content of the message to MMPCD-D 840 (msg 804) via the established web socket connection. CPS 850 also sends a second web socket message to MMPCD-D 840 (msg 806) in the form of a forwarded_es_event message. The forwarded_es_event message is a wrapper around the underlying message and identifies MMPCD-A 810 and MMPCD-B 420 as the intended recipients in the 'to' field. MMPCD-D 840 receives and plays the content of msg 804 as it would normally. Additionally, MMPCD-D 840, in its role as proxy, re-packages msg 806 into an over-the-air LoRa message 808 and broadcasts it out. Any devices receiving the broadcast of msg 808 will check the 'to' field to determine whether msg 808 is intended for them. If it is, the receiving device (e.g., MMPCD-A 810 and MMPCD-B 420) will play the message (msg 808). If it is not, the receiving device will ignore the message (msg 808). In this example, MMPCD-C 830 will receive the LoRa broadcast of msg 808 as it is a member of the logical channel. However, as the original sender of the message, MMPCD-C 830 will suppress playback of msg 808.

The proxy device described above was MMPCD-D 840. It should be noted, however, that the proxy device (D) 840 could be a special purpose LoRa access point 140 that performs the proxy functions as described above.

Although the above operations are described sequentially, many of the operations can be performed in parallel or concurrently. In addition, the order of the operations may be rearranged. A process may have additional steps not included in FIGS. 4-6. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

The methods, devices, and systems described above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as a FPGA specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a RAM coupled to the processor. The processor executes computer-executable program instructions stored in memory, such as executing one or more computer programs. Such processors may comprise a microprocessor, a digital signal processor ("DSP"), an application-specific integrated circuit ("ASIC"), FPGAs, and state machines. Such processors may further comprise programmable electronic devices such as PLCs, programmable interrupt controllers ("PICs"), programmable logic devices ("PLDs"), programmable read-only memories ("PROMs"), electronically programmable read-only memories ("EPROMs" or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

That which is claimed is:

1. A method to enable a disconnected multi-modal portable communication device (MMPCD) having a unique identifier to receive messages from a cloud-based communication platform server (CPS) via a proxy device and a connection to the CPS, the method comprising:
   in the proxy device:
      receiving a first message over a web socket connection from the CPS, the first message comprising: (i) a 'to' field containing the unique device identifier associated with the disconnected MMPCD and (ii) a forwarding envelope containing the message content;
      converting the first message to a format suitable for transmission via an over-the-air radio frequency (RF) interface;
      sending the converted message via the over-the-air radio frequency (RF) interface to the disconnected MMPCD.

2. The method of claim 1, the converted message comprising a header portion and a payload portion, wherein the header portion is comprised of a message type, a sending device identifier, and a receiving device identifier and the payload portion is comprised of message content.

3. The method of claim 2, wherein the converted message header portion sending device identifier is a unique identifier of the proxy device and the converted message header portion receiving device identifier is the unique identifier of the disconnected MMPCD.

4. The method of claim 3, wherein the converted message header portion message type indicates a speech type and the payload portion message content comprises speech.

5. The method of claim 1, wherein the over-the-air radio frequency (RF) interface is a LoRa interface.

6. The method of claim 5, wherein the proxy device is one of another MMPCD and a special purpose LoRa forwarding device.

7. A system to enable a disconnected multi-modal portable communication device (MMPCD) having a unique identifier to receive messages from a cloud-based communication platform server (CPS) via a proxy device having a unique identifier and a connection to the CPS, the system comprising:
- a CPS;
- a disconnected MMPCD; and
- a proxy device having a connection to the CPS, the proxy device configured to:
  - receive a first message over a web socket connection from the CPS, the first message comprising: (i) a 'to' field containing the unique device identifier associated with the disconnected MMPCD and (ii) a forwarding envelope containing the message content;
  - convert the first message to a format suitable for transmission via an over-the-air radio frequency (RF) interface;
  - send the converted message via the over-the-air radio frequency (RF) interface to the disconnected MMPCD.

8. The system of claim 7, the converted message comprising a header portion and a payload portion, wherein the header portion is comprised of a message type, a sending device identifier, and a receiving device identifier and the payload portion is comprised of message content.

9. The system of claim 8, wherein the converted message header portion sending device identifier is a unique identifier of the proxy device and the converted message header portion receiving device identifier is the unique identifier of the disconnected MMPCD.

10. The system of claim 9, wherein the converted message header portion message type indicates a speech type and the payload portion message content comprises speech.

11. The system of claim 7, wherein the over-the-air radio frequency (RF) interface is a LoRa interface.

12. The system of claim 11, wherein the proxy device is one of another MMPCD and a special purpose LoRa forwarding device.

13. One or more non-transitory computer-readable mediums comprising program code executable by one or more processors to cause the one or more processors to enable a disconnected multi-modal portable communication device (MMPCD) having a unique identifier to receive messages from a cloud-based communication platform server (CPS) via a proxy device having a unique identifier and a connection to the CPS and further configured for wireless communication with the disconnected MMPCD, the program code configured to:
- in the proxy device:
  - receive a first message over a web socket connection from the CPS, the first message comprising: (i) a 'to' field containing the unique device identifier associated with the disconnected MMPCD and (ii) a forwarding envelope containing the message content;
  - convert the first message to a format suitable for transmission via an over-the-air radio frequency (RF) interface;
  - send the converted message via the over-the-air radio frequency (RF) interface to the disconnected MMPCD.

14. The non-transitory computer-readable mediums of claim 13, the converted message comprising a header portion and a payload portion, wherein the header portion is comprised of a message type, a sending device identifier, and a receiving device identifier and the payload portion is comprised of message content.

15. The non-transitory computer-readable mediums of claim 14, wherein the converted message header portion sending device identifier is a unique identifier of the proxy device and the converted message header portion receiving device identifier is the unique identifier of the disconnected MMPCD.

16. The non-transitory computer-readable mediums of claim 15, wherein the converted message header portion message type indicates a speech type and the payload portion message content comprises speech.

17. The non-transitory computer-readable mediums of claim 13, wherein the over-the-air radio frequency (RF) interface is a LoRa interface.

18. The non-transitory computer-readable mediums of claim 17, wherein the proxy device is one of another MMPCD and a special purpose LoRa forwarding device.

\* \* \* \* \*